United States Patent
Dale

(10) Patent No.: US 8,849,193 B2
(45) Date of Patent: Sep. 30, 2014

(54) ES/NO BASED CARRIER-IN-CARRIER RF POWER CONTROL

(71) Applicant: Comtech EF Data Corp., Tempe, AZ (US)

(72) Inventor: Mark Dale, Scottsdale, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 237 days.

(21) Appl. No.: 13/661,632

(22) Filed: Oct. 26, 2012

(65) Prior Publication Data

US 2013/0045698 A1   Feb. 21, 2013

Related U.S. Application Data

(63) Continuation-in-part of application No. 12/986,017, filed on Jan. 6, 2011, now Pat. No. 8,634,778.

(60) Provisional application No. 61/318,739, filed on Mar. 29, 2010, provisional application No. 61/552,248, filed on Oct. 27, 2011.

(51) Int. Cl.
| | |
|---|---|
| *H04B 7/185* | (2006.01) |
| *H04W 52/16* | (2009.01) |
| *H04B 17/00* | (2006.01) |
| *H04W 52/24* | (2009.01) |

(52) U.S. Cl.
CPC ............ *H04W 52/16* (2013.01); *H04W 52/241* (2013.01); *H04B 17/009* (2013.01)
USPC .......................................... 455/13.4; 455/522

(58) Field of Classification Search
USPC ................................................ 455/13.4, 522
See application file for complete search history.

(56) References Cited

U.S. PATENT DOCUMENTS

| | | | |
|---|---|---|---|
| 8,094,606 B1 * | 1/2012 | Foley et al. | 370/318 |
| 8,634,778 B1 * | 1/2014 | Dale | 455/63.1 |
| 2003/0054816 A1 | 3/2003 | Krebs et al. | |
| 2011/0003543 A1 | 1/2011 | Laufer | |

FOREIGN PATENT DOCUMENTS

| | | | |
|---|---|---|---|
| CN | 102118843 A | 7/2011 | |
| RU | 2009139237 A | 5/2011 | |
| WO | 2009130701 A1 | 10/2009 | |
| WO | WO2013/063424 A1 * | 5/2013 | ......... H04W 17/009 |

* cited by examiner

*Primary Examiner* — Lee Nguyen
(74) *Attorney, Agent, or Firm* — Booth Udall Fuller, PLC

(57) ABSTRACT

A method of transmitting telecommunications data comprising modulating first and second data signals, selecting transmit powers first and second terminals to achieve a predetermined power equivalent bandwidth (PEB) through an un-attenuated, transmitting the first data signal to the second terminal and the second data signal to the first terminal through a remote receiver, measuring a total received signal-to-noise ratio of the first and second data signals and a total received signal-to-noise ratio received at the second and first terminals, respectively, measuring a signal-power density ratio between the first and second signals, determining a ratio of excess uplink to downlink losses based a rain model parameter and operating frequency, calculating excess uplink and downlink losses relative an optimized, un-attenuated telecommunications channel, and changing a transmit power of a terminal such that the predetermined PEB is maintained when at least one of the signals experiences attenuation.

28 Claims, 3 Drawing Sheets

ES/NO BASED CARRIER-IN-CARRIER RF POWER CONTROL

CROSS REFERENCE TO RELATED APPLICATIONS

This document claims the benefit of the filing date of U.S. Provisional Patent Application No. 61/552,248, entitled "Es/No Based Carrier-in-Carrier RF Power Control" to Mark Dale which was filed on Oct. 27, 2011 and is a continuation in part of U.S. application Ser. No. 12/986,017, entitled "Carrier-in-Carrier Based Performance Optimization Systems and Related Methods" to Mark Dale which was filed on Jan. 6, 2011, which claims benefit to U.S. Provisional Patent Application No. 61/318,739, entitled "Carrier-in-Carrier Based Performance Optimization Systems and Related Methods" to Mark Dale which was filed on Mar. 29, 2011, the disclosures of all of which are hereby incorporated entirely herein by reference.

BACKGROUND

Technical Field

Aspects of this document relate generally to telecommunication systems and connections. Particular implementations also include, more specifically, satellite communication systems and communication links.

Satellite communications systems transmit and receive information bearing signals. Systems that employ signal-cancellation algorithms that enable terminals on each side of the link to share common transmit carrier frequencies are referred to as Carrier-in-Carrier ("CnC") based systems. CnC based systems receive a composite signal containing both the signal from the opposite terminal and its own signal transponded by the satellite. These systems have the capability to measure the received power of each of these signals as part of the process of signal cancellation.

Implementations of carrier-in-carrier ("CnC") based performance optimization systems and related methods relate to systems and methods for transmitting data across a telecommunication channel.

SUMMARY

Implementations of a method of transmitting telecommunications data may comprise modulating a first and a second data signal for transmitting over a telecommunications system using a modulation format, selecting transmit powers of a first terminal and a second terminal such that a predetermined power equivalent bandwidth (PEB) is achieved through an un-attenuated telecommunications channel of the telecommunications system, transmitting the first and second data signals through the telecommunications channel to a remote receiver, the first data signal being transmitted from the first terminal and the second data signal being transmitted from the second terminal, transmitting, by the remote receiver, the first data signal to the second terminal and the second data signal to the first terminal, measuring a total received signal-to-noise ratio of the first data signal received at the second terminal and a total received signal-to-noise ratio of the second data signal received at the first terminal, measuring a ratio of a signal power density of the first data signal to a signal power density of the second data signal, determining a ratio of excess uplink loss at the first terminal to excess downlink loss at the first terminal based on one or more rain model parameters and an operating frequency of the remote receiver, calculating excess uplink and downlink losses relative to uplink and downlink losses of an optimized, un-attenuated telecommunications channel, and changing a transmit power of at least one of the first and second terminals such that the predetermined PEB is maintained for the telecommunications channel when at least one of the first and second data signals experiences attenuation from one or more external environmental factors.

Particular implementations may include one or more of the following aspects. Maintaining the predetermined PEB may further comprise optimizing a link margin of the first data signal and a link margin of the second data signal, wherein each link margin is equal to a difference between signal-to-noise ratio of a data signal received at one terminal and a threshold signal-to-noise ratio. Calculating the uplink and downlink losses for the telecommunications channel may further comprise estimating one or more of four component signal-to-noise ratio values in the telecommunications channel. Calculating the uplink and downlink losses may be based on one or more un-attenuated communications parameter assumptions without estimating at least one component signal-to-noise link budget value.

The method may further comprise conducting a link budget analysis to determine a ratio of uplink to downlink signal-to-noise for at least one of the first and second data signals transmitted over the un-attenuated telecommunications channel. The method may further comprise monitoring at least one of the link margins for a loss in performance of a telecommunications link. The first and second data signals may be optimized when the link margin of the first data signal and the link margin of the second data signal are equal at the first and second terminals.

The method may further comprise estimating an uplink to downlink excess loss ratio (K) by applying estimation averaging of pre-determined ratios of uplink to downlink attenuation based on one or more rain models for one or more rain attenuation factors at a remote receiver carrier frequency or frequency band. The method may further comprise estimating of an uplink to downlink excess loss ratio (K) using one or more values obtained from measurements of a received data signal. The method may further comprise adjusting the transmit power of one or more terminals when a change in the uplink to downlink excess loss ratio (K) is detected.

The method may further comprise iteratively monitoring the link margins and determining whether an imbalance of signal-to-noise ratio exists between two terminals that exceeds a predetermined threshold after an adjustment of the transmit power of one or more terminals has been made in response to detecting attenuation. The method may further comprise monitoring a signal-to-noise ratio of a received data signal at two or more receiving terminals. The method may further comprise detecting unequal link margins at the two or more terminals. The method may further comprise optimizing the first and second data signals if an imbalance of link margins between two terminals is detected that exceeds a predetermined threshold.

Implementations of a system of transmitting telecommunications data may comprise one or more modulators configured to modulate a first and a second data signal using a modulation format, one or more transmitters configured to receive the first and second data signals from the one or more modulators and that are configured to transmit the first and second data signals at selected power levels of a first terminal and a second terminal such that a predetermined power equivalent bandwidth (PEB) is achieved through an un-attenuated telecommunications channel, a remote receiver configured to receive the first data signal transmitted by the first terminal and the second data signal transmitted by the second terminal and transmit the first data signal to the second terminal and the second data signal to the first terminal, one or more signal processors configured to: measure a total received signal-to-noise ratio of the first data signal received at the second terminal and a total received signal-to-noise ratio of the second data signal received at the first terminal, measure a ratio of a signal power density of the first data signal to a signal power density of the second data signal, determine a ratio of excess uplink loss to excess downlink based on one or more rain model parameters and remote receiver carrier operating frequency, determine a ratio of excess uplink and downlink losses at the first and second terminals relative to uplink and downlink losses of an un-attenuated telecommunications channel, and one or more power controllers configured to change a transmit power of at least one of the first and second terminals such that the pre-determined PEB is maintained for the telecommunications channel when at least one of the first and second data signals experiences attenuation from one or more external environmental factors.

Particular implementations may include one or more of the following aspects. The one or more power controllers may be further configured to maintain the predetermined PEB while optimizing a link margin of the first data signal and a link margin of the second data signal, wherein the link margin is equal to a difference between signal-to-noise ratio of a data signal received at one terminal and a threshold signal-to-noise ratio. The one or more processors may be further configured to calculate uplink and downlink losses for the telecommunications channel by estimating one or more of four component signal-to-noise ratio values in the un-attenuated telecommunications channel. The one or more processors may be further configured to calculate uplink and downlink losses using one or more un-attenuated communications parameter assumptions without estimating one or more component signal-to-noise link budget values.

The one or more processors may be further configured to conduct a link budget analysis to determine a ratio of uplink to downlink signal-to-noise for at least one of the first or second data signals transmitted over the un-attenuated telecommunications channel. The one or more signal processors may be configured to monitor at least one of the margins for a loss in performance of a telecommunications link. The first and second data signals may be optimized when the margin of the first data signal and the margin of the second data signal are equal at the first and second terminals.

The one or more signal processors may be further configured to estimate an uplink to downlink excess loss ratio (K) by applying estimation averaging of pre-determined ratios of uplink to downlink attenuation based on one or more rain models for one or more rain attenuation factors at a remote receiver carrier frequency or frequency band. The one or more signal processors may be further configured to estimate an uplink to downlink excess loss ratio (K) using one or more values obtained from measurements of a received data signal. The one or more power controllers may be further configured to adjust the transmit power of one or more terminals when a change in the excess loss ratio is detected.

The one or more signal processors may be further configured to iteratively monitor the link margins and determine whether an imbalance of signal-to-noise ratio exists between two terminals that exceeds a predetermined threshold after an adjustment of the transmit power of one or more terminals has been made in response to detecting attenuation. The one or more signal processors may be further configured to monitor a signal-to-noise ratio of a received data signal at two or more receiving terminals. The one or more signal processors may be further configured to detect unequal link margins at the two or more terminals. The one or more power controllers may be further configured to optimize the first and second data signals if an imbalance of link margins between two terminals is detected that exceeds a predetermined threshold.

Aspects and applications of the disclosure presented here are described below in the drawings and description. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless it is clearly stated otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. §112, ¶6. Thus, the use of the words "function," "means" or "step" in the Description, Drawings or claims is not intended to somehow indicate a desire to invoke the special provisions of 35 U.S.C. §112, ¶6, to define this disclosure. To the contrary, if the provisions of 35 U.S.C. §112, ¶6 are sought to be invoked to define the disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

The optimal ratio of power levels of the two signals that comprise the composite signals for carrier-in-carrier (CnC) signals may depend on various internal and external factors. For example, satellite communication signals may be attenuated by rain loss and other factors on one or both sides of the communication link. At the satellite, the composite signal is allocated a fixed and finite Power Equivalent Bandwidth (PEB). PEB is a commonly understood term and is the equivalent bandwidth that the signal would occupy if, for a given transponder, the ratio of the signal's satellite transmit power to the total available satellite transmit power is set equal to the ratio of the PEB to the total available transponder bandwidth.

Implementations of CnC based performance optimization systems and methods like those disclosed in this document enable the automatic calculation and control of the terminal transmit powers and signal power ratios in the composite CnC signal. Particular implementations disclosed herein may automatically optimize power ratios in a composite CnC carrier while maintaining constant PEB at the satellite to provide optimal link margin for each terminal, and maintain this optimum solution under rain loss conditions on either side of the link. Accurate measurement of radio frequency (RF) power has some limitations in practical systems, and in some implementations, it may be desirable to use signal-to-noise ratio (SNR or equivalently Es/No or Eb/No) measurements instead of RF power measurements as the basis of the Automatic CnC Power Control (ACPC) algorithm. The current disclosure extends the ACPC algorithm to include ground-based measurements of Es/No (rather than RF power) as the basis for the algorithm. While particular implementations are disclosed involving a satellite, the principles disclosed in this document could be used in any of a wide variety of other telecommunication systems that a CnC signal, such as, by non-limiting example, terrestrial wireless hub/spoke systems, cellular telephone communication systems, microwave communication systems, and other telecommunication system types.

Figure 1:
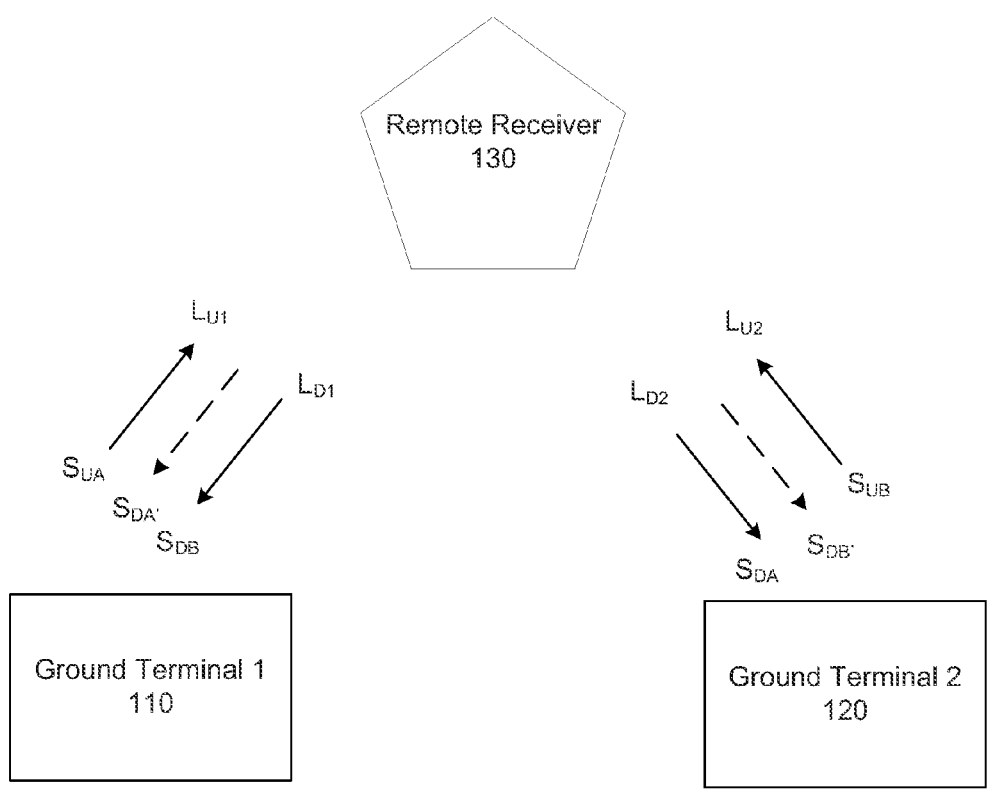
FIG. 1 depicts a configuration of a satellite in communication with ground terminals.

FIG. 1 depicts an example of a CnC satellite link model using a satellite as a remote receiver as depicted. The following variables as defined below are used throughout the remainder of this disclosure:

$S_{UA}$=Uplink SNR (Es/No) of Signal A from Terminal 1 (Clear Sky)

$S_{DA}$=Downlink SNR of Signal A to Terminal 2 (Clear Sky)

$S_{DA'}$=Downlink SNR of Signal A back to Terminal 1 (Clear Sky)

$S_{UB}$=Uplink SNR (Es/No) of Signal B from Terminal 2 (Clear Sky)

$S_{DB}$=Downlink SNR of Signal B to Terminal 1 (Clear Sky)

$S_{DB'}$=Downlink SNR of Signal B back to Terminal 2 (Clear Sky)

$S_{TA}$=Total SNR of Signal A, as measured at Terminal 2 (Clear Sky)

$S_{TA'}$=Total SNR of Signal A, as seen at Terminal 1 (Clear Sky)

$S_{TB}$=Total SNR of Signal B, as measured at Terminal 1 (Clear Sky)

$S_{TB'}$=Total SNR of Signal B, as seen at Terminal 2 (Clear Sky)

$$R_{CS} = CnC \text{ Ratio in composite signal} - \text{Clear Sky}$$
$$\equiv \frac{S_{TA}}{S_{TB'}} = \frac{S_{TA'}}{S_{TB}}$$

$L_{U1}$=Excess uplink loss at Terminal 1

$L_{D1}$=Excess downlink loss at Terminal 1 (degradation to downlink SNR, including signal attenuation and sky noise temperature increase)

$L_{U2}$=Excess uplink loss at Terminal 2

$L_{D2}$=Excess downlink loss at Terminal 2 (degradation to downlink SNR)

As shown in FIG. 1, Signals A and B are modulated and transmitted from ground terminals 110, 120 to remote satellite receiver 130 and are then transmitted from the remote receiver 130 to the opposite ground terminal 110, 120. Signal-to-noise ratios of Signal A received at ground terminal 2 120 and of Signal B received at ground terminal 1 110 are measured using well known techniques for estimating received signal SNR. The power density ratio of Signal A to Signal B in the composite signal (CnC Ratio) is also measured. One or more transmit powers $T_A$ and $T_B$ may then be adjusted to optimize the telecommunications link. The link margin of a given signal is defined as the difference in dB between the SNR of that signal and a threshold SNR where some fixed decoded error rate is expected. In most implementations, optimal link margins may be considered to be realized when the link margin of Signal A is set equal to the link margin of Signal B. In other implementations, the optimal solution may be considered to be realized when the link margins for Signal A and Signal B are different. In this second case, another parameter such as, for example, link availability may set equal on both sides for optimality to be achieved. The specific algorithms of the described implementation apply to the former view of optimality. However, the proposed approach may easily be extended and modified by those of ordinary skill to satisfy either definition. In either case, if bi-directional communication is required, at the point at which the communication link is lost due to excess link attenuation, any optimal solution may provide for a zero margin for both Signal A and Signal B. The particular described implementations satisfy this condition and hence optimize overall link availability.

Figure 2:
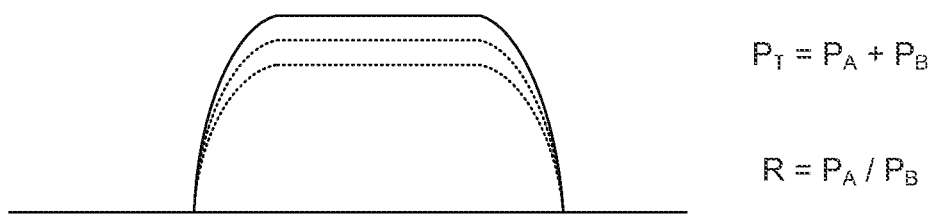
FIG. 2 is a graph of a composite telecommunications signal, showing an example of individual power densities comprising the composite signal.

FIG. 2 provides a graph of a sample composite CnC signal, comprised of two signals, transmitted from each ground station. As illustrated in FIG. 2, differences in ground terminal antenna gain, and other link margin parameters generally make the optimal ratio of the power of Signal A to the power of Signal B (the optimal CnC ratio) a value other than unity.

Figure 3:
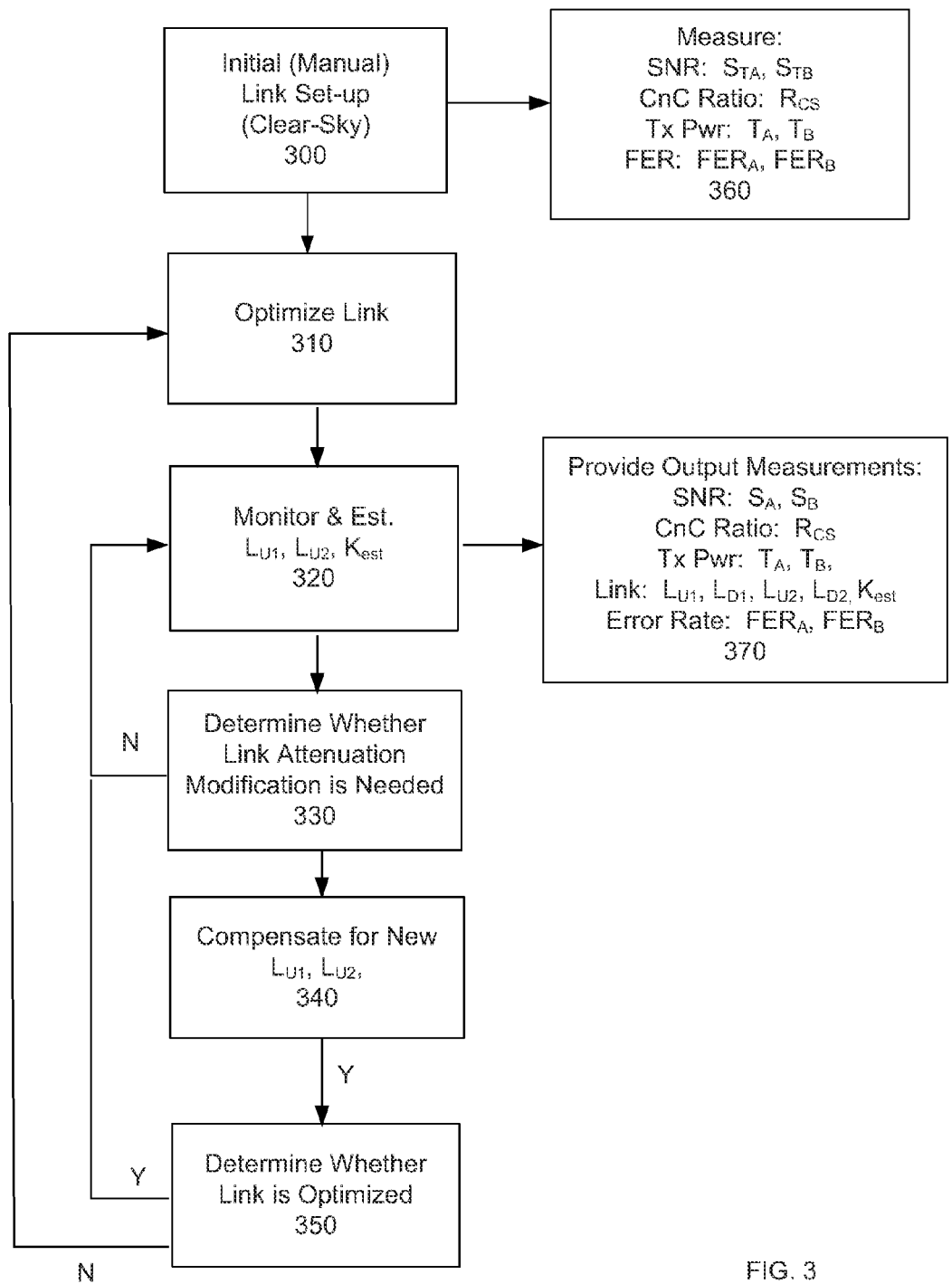
FIG. 3 is a block diagram of a method of optimizing a telecommunications link.

As shown in FIG. 3, which is a block diagram of a method of providing an optimal CnC solution by implementing a CnC power control algorithm, implementations of a CnC power control algorithm can require knowledge of measured parameters on both sides of the link for a successful performance optimization to occur. Thus, communication between modems or other appropriate components may be necessary. For example, it will be shown in later calculations that an exact realization of an optimal solution requires information that is measured at both terminals. In addition, knowledge of the link margin on both sides of the link is necessary in order to optimize the link margins on both sides. Direct measurements of frame error rate (FER) or other direct link error measurements are also desirable in order to gain positive feedback on potential link errors because the modem is actively changing power levels without manual control or operator feedback.

One of ordinary skill in the art would recognize that the waveforms provided in this disclosure may comprise building blocks such as mechanism of modem-to-modem communication, and Cyclic Redundancy Check (CRC) or other direct methods of monitoring frame error rate (FER) during operation.

Set-up of the initial link is typically accomplished in initial (e.g. clear sky) conditions 300 in a manner that those of ordinary skill in the art will recognize as being similar to the set-up of a non-CnC link. Measurements of SNR's, Rx Power, Tx Power, CnC ratios, and error rates 360 may be taken during this initial link set-up. The only critical factor that must be established by the user during set-up is that the modem transmit power must be set to levels that achieve the target Power Equivalent Bandwidth (PEB) of the composite signal on the satellite because the optimal signal-to-noise balance and tracking of potential link losses due to rain or other factors will be handled automatically. The transmit power levels, $T_A$ and $T_B$, which yield the target PEB in the nominal initial conditions may be determined in conjunction with the satellite operator using "line-up" procedures that are familiar to those having ordinary skill in the art.

The initial link measures the received signal to noise ratio ("SNR") values of $S_{TA}$ and $S_{TB}$ and have known associated threshold SNR values of $S_{ATh}$ and $S_{BTh}$, dependent upon the modulation and forward error correction (FEC) types used on the link. This disclosure provides for the use of any modulation and FEC type as known to those of ordinary skill in the art.

The following terms are defined below and will be used throughout the remainder of this disclosure:

$$M_{AdB} = \text{Margin of Link } A \text{ expressed in decibels} \quad [1]$$
$$= S_{TAdB} - S_{AThdB}$$

$$M_{BdB} = \text{Margin of Link } B \text{ expressed in decibels} \quad [2]$$
$$= S_{TBdB} - S_{BThdB}$$

$$\Delta M_{BAdB} = \text{Difference in Margin expressed in decibels} \quad [3]$$
$$= M_{BdB} - M_{AdB}$$

$\Delta T_{AdB}$=Change in transmit power of uplink Signal A (Terminal 1) expressed in decibels $\Delta T_{BdB}$=Change in transmit power of uplink Signal B (Terminal 2) expressed in decibels $R_{dB}$=CnC Ratio of expressed in decibels In some implementations, the nominal link may be optimized 310 by changing the transmit RF power of Terminal 1 and Terminal 2 thereby causing the margin at each terminal to be the same. In other implementations, a known offset may be introduced, for example, to compensate for differences in rain regions associated with each terminal. In satellite communications, satellite capacity is often leased in terms of Power Equivalent Bandwidth (PEB). PEB is the equivalent bandwidth that the signal would occupy if, for a given transponder, the ratio of the signal's transmit power to the total available satellite transmit power is set equal to the ratio of the PEB to the total available transponder bandwidth. It is often important that the composite signal maintain a constant target PEB in order to satisfy the leasing agreement. Because the composite signal achieves the target PEB, changes in RF power are made under the constraint that the transmit RF powers of the terminals are modified such that the PEB of the composite signal remains the same.

Under linear conditions, a change in transmit power ΔT directly affects the link margin M. Hence, in equation form, the link is optimized if:

$$M_{AdB} + \Delta T_{AdB} - (M_{BdB} + \Delta T_{BdB}) = 0$$

Which implies:

$$\Delta M_{BAdB} = \Delta T_{AdB} - \Delta T_{BdB} \quad [4]$$

The same terms are defined below in non-decibel form:

$$\Delta T_A = \text{Change in transmit power of uplink Signal } A \quad [5]$$
$$\quad (\text{Terminal 1}) \text{ expressed in linearly (e.g. in mW)}$$
$$= 10^{\Delta T_{AdB}/10}$$

$$\Delta T_B = \text{Change in transmit power of uplink Signal } B \quad [6]$$
$$\quad (\text{Terminal 2}) \text{ expressed in linearly (e.g. in mW)}$$
$$= 10^{\Delta T_{BdB}/10}$$

$$R = CnC \text{ Ratio of expressed linearly} \quad [7]$$
$$= 10^{R_{dB}/10}$$

$$\Delta M_{BA} = \text{Difference in Margin expressed linearly} \quad [8]$$
$$= 10^{\Delta M_{BAdB}/10}$$

$$= \frac{\Delta T_A}{\Delta T_B} \quad [9]$$

It can be shown that in order to maintain constant PEB, the relationship between $\Delta T_A$ and $\Delta T_B$ is:

$$\Delta T_B = 1 + (1 - \Delta T_A) R \quad [10]$$

Combining [9] and [10] yields:

$$\Delta T_A = \frac{(1+R)\Delta M_{BA}}{1 + R \Delta M_{BA}} \quad [11]$$

$$\Delta T_{AdB} = 10 \log_{10}(\Delta T_A) \quad [12]$$

$$\Delta T_B = \frac{(1+R)}{1 + R \Delta M_{BA}} \quad [13]$$

$$\Delta T_{BdB} = 10 \log_{10}(\Delta T_B) \quad [14]$$

The parameters $\Delta M_{BA}$ and R are derived from modem measurements of SNR and knowledge of the SNR thresholds for a given modulation and coding combination (Equations [1]-[3], [7] and [8]).

Implementations of the optimal algorithm may include two key stages. First, the clear sky uplink and downlink component SNRs (equivalently Es/No's) are derived from the total SNR and CnC ratios measured on the ground, coupled with one known clear sky uplink-to-downlink components of the SNR ratio, the value of which may be estimated using a link budget analysis.

Next, excess loss terms are calculated in operation based on continued monitoring of Es/No values, CnC ratios, and assumed uplink-to-down power loss ratios made from rain model analysis. A more detailed explanation of possible implementations of each stage is provided below.

Stage 1: Clear Sky SNR Component Calculation

Total clear-sky SNRs in a satellite link are the parallel combination of component clear-sky SNRs (when component SNRs are not expressed in dB). Using the component SNR terms defined above:

$$S_{TA} = \frac{S_{UA}S_{DA}}{S_{UA} + S_{DA}}, S_{TA'} = \frac{S_{UA}S_{DA'}}{S_{UA} + S_{DA'}}$$ [15]

$$S_{TB} = \frac{S_{UB}S_{DB}}{S_{UB} + S_{DB}}, S_{T2'} = \frac{S_{UB}S_{DB'}}{S_{UB} + S_{DB'}}$$

The clear-sky CnC Ratio is defined as the SNR ratios of the two components of the composite signal:

$$R_{CS} = \frac{S_{TA'}}{S_{TB'}} = \frac{S_{TA}}{S_{TB'}}$$ [16]

This ratio is alternately measured by the following component SNRs:

$$R_{CS} = \frac{S_{UA}}{S_{UB}} = \frac{S_{DA'}}{S_{DB}} = \frac{S_{DA}}{S_{DB'}}$$ [17]

In some implementations, the values of $S_{TA}$, $S_{TB}$ and $R_{CS}$ are directly measured by the modems (Terminal 1 measures $S_{TB}$ and $R_{CS}$, Terminal 2 measures $S_{TA}$ and $R_{CS}$). There are four independent component clear sky SNR values to calculate, but only three independent measured values on the ground. Hence one additional quantity must be known or estimated in order to make the initial calculation of component SNR values.

In this analysis, it will be assumed that the ratio of the clear sky uplink-to-downlink SNR can be known or estimated for Signal A:

$$Q = \frac{S_{UA}}{S_{DA}}$$ [18]

If the terminal and satellite parameters are known, this quantity can be readily determined using a link budget analysis tool for the link in question. With the value of "Q" known, the component SNR values can be expressed in terms of Q and measured parameters as:

$$S_{UA} = S_{TA}(1 + Q)$$ [19]

$$S_{DA} = S_{TA}\frac{1 + Q}{Q}$$

$$S_{UB} = S_{TA}\frac{1 + Q}{R_{CS}}$$

$$S_{DB} = \frac{S_{TA}S_{TB}(1 + Q)}{S_{TA}(1 + Q) - R_{CS}S_{TB}}$$

$$S_{DA'} = \frac{R_{CS}S_{TA}S_{TB}(1 + Q)}{S_{TA}(1 + Q) - R_{CS}S_{TB}}$$

$$S_{DB'} = R_{CS}S_{TA}\frac{1 + Q}{Q}$$

Since $S_{SB}$ cannot be negative, there is a lower limit to the value of Q, which can be expressed as:

$$Q_{min} > \frac{R_{CS}S_{TA}}{S_{TB}} - 1$$ [20]

Stage 2: Calculate Excess Loss Terms

With the clear-sky component Es/Nos determined by Equation [19], the Es/No components in the presence of rain loss can be expressed as:

$$S_{UA(L)} = L_{U1}S_{UA}$$ [21]

$$S_{DA(L)} = L_{U1}L_{D2}S_{DA}$$ [22]

$$S_{UB(L)} = L_{U2}S_{UB}$$ [23]

$$S_{DB(L)} = L_{U2}L_{D1}S_{DB}$$ [24]

$$S_{DA'(L)} = L_{U1}L_{D1}S_{DA'}$$ [25]

$$S_{DB'(L)} = L_{U2}L_{D2}S_{DB'}$$ [26]

Note that none of the above terms are expressed in dB. For practical rain conditions, the uplink and downlink rain loss terms (in dB) can be approximated as a constant:

$$\frac{L_{U1dB}}{L_{D1dB}} = K$$ [27]

Which in turn implies that in non-dB terms:

$$L_{U1} = L_{D1}{}^{K}$$ [28]

It is important to note that the ratio, K, is different than the ratio that is used when considering measured power values. This is because the component Es/No in the downlink is affected both by the increased path attenuation and also by sky noise temperature increase due to rain (downlink signal power values are only affected by the increased path attenuation).

Link budget analysis tools can be used to get an approximation of a value of K to use. For a given satellite frequency band of interest, uplink and downlink losses can be calculated at various rain rates. Results for one example link at Ku-band frequencies are shown in the Table below. Note that the calculated value of K will be different for different satellite frequency bands (e.g. different for C-band, X-band, Ka-band, etc.). In addition, those of ordinary skill could use different approaches to approximate different values of K without significantly modifying the approach described by this patent disclosure.

| RR mm/hr | UL Attn | DL Tot Deg. | K (Es/No) |
|---|---|---|---|
| 5 | 2.21 | 2.79 | 0.79 |
| 10 | 2.95 | 4.06 | 0.73 |
| 15 | 3.57 | 5.23 | 0.68 |
| 20 | 4.13 | 6.28 | 0.66 |
| 25 | 4.65 | 7.23 | 0.64 |
| 30 | 5.13 | 8.1 | 0.63 |
| 35 | 5.57 | 8.85 | 0.63 |
| 40 | 6 | 9.46 | 0.63 |
| 45 | 6.4 | 10.02 | 0.64 |
| | | Avg. | 0.67 |
| | | Std Dev. | 0.06 |
| | | % of avg | 9% |

Under rain loss conditions, the SNRs measured by the terminals can be written as:

$$S_{TA(L)} = L_{U1}L_{D2}\frac{S_{UA}S_{DA}}{S_{UA}+L_{D2}S_{DA}} \qquad [29]$$

$$S_{TB(L)} = L_{U2}L_{D1}\frac{S_{UB}S_{DB}}{S_{UB}+L_{D1}S_{DB}} \qquad [30]$$

Likewise, the SNR of the Signal A, measured at Terminal 1 (i.e. the SNR of the reflected carrier) under rain loss conditions can be written as:

$$S_{TA'(L)} = L_{U1}L_{D1}\frac{S_{UA}S_{DA'}}{S_{UA}+L_{D1}S_{DA'}} \qquad [31]$$

The CnC ratio also changes under rain loss conditions. The rain loss CnC ratio can be written as:

$$R_L = \frac{S_{TA'(L)}}{S_{TB(L)}} \qquad [32]$$

Using [17] and [32] in [31] yields:

$$S_{TB(L)} = L_{U1}L_{D1}\frac{(R_{CS}/R_L)S_{UA}S_{DB}}{S_{UA}+L_{D1}R_{CS}S_{DB}} \qquad [33]$$

Using [28] in [33] results in:

$$L_{D1}^{K+1}F_1 - L_{D1}F_2 - F_3 = 0 \qquad [34]$$

where $$F_1 = \frac{R_{CS}}{R_L}S_{UA}S_{DB} \qquad [35]$$

$$F_2 = R_{CS}S_{DB}S_{TB(L)} \qquad [36]$$

$$F_3 = S_{UA}S_{TB(L)} \qquad [37]$$

Equation [34] can be solved by Newton's method, with $L_{D1}=x_{n+1}$ in the following recursion:

$$x_{n+1} = x_n + \frac{f(x_n)}{f'(x_n)} \qquad [38]$$

$$f(x) = x^{K+1}F_1 - xF_2 - F_3 \qquad [39]$$
$$f'(x) = (K+1)x^K F_1 - F_2$$

An initial value of $x_0=1$ can be used to start the algorithm. Six iterations (n=0 to 5) are typically sufficient to converge to a result. Once $L_{D1}$ is known, [28] is used to calculate $L_{U1}$.

Likewise, the SNR of the Signal B, measured at Terminal 2 (i.e. the SNR of the reflected carrier) under rain loss conditions can be written as:

$$S_{TB'(L)} = L_{U2}L_{D2}\frac{S_{UB}S_{DB'}}{S_{UB}+L_{D2}S_{DB'}} \qquad [40]$$

The rain loss CnC ratio can also be written as:

$$R_L = \frac{S_{TA(L)}}{S_{TB'(L)}} \qquad [41]$$

Using [17] and [41] in [40] yields:

$$S_{TA(L)} = L_{U2}L_{D2}\frac{(R_L/R_{CS})S_{UB}S_{DA}}{S_{UB}+L_{D2}(1/R_{CS})S_{DA}} \qquad [42]$$

The uplink and downlink excess loss terms are again assumed related by constant K:

$$L_{U2} = L_{D2}^K \qquad [43]$$

Using in [43] in [42] results in $$L_{D2}^{K+1}F_1 - L_{D2}F_2 - F_3 = 0 \qquad [44]$$

where $$F_1 = \frac{R_L}{R_{CS}}S_{UB}S_{DA} \qquad [45]$$

$$F_2 = \frac{1}{R_{CS}}S_{DA}S_{TA(L)} \qquad [46]$$

$$F_3 = S_{UB}S_{TA(L)} \qquad [47]$$

Equation [44] can be solved by Newton's method, in a similar manner as Equation [34], using Equations [38] and [39] with appropriate values of F1-F3 given by [45]-[47].

Approximate Algorithm: The foregoing analysis described one possible realization, given that the defined value of "Q" is known or can be estimated by link budget analysis. It will be clear to those of ordinary skill that alternate component SNR ratios could likewise be defined and similar analysis performed. Since the value of Q is often not known, or not readily calculated by all possible satellite communications users, an approximation of the optimal algorithm that does not require this knowledge is desirable.

Approximate versions of the algorithm are possible by making assumptions about the satellite link. One approximation is possible by assuming that Q>>0. With this assumption, it follows from the definition of Q that $S_{UA} >> S_{DA}$, and since $R_{CS}$ is finite, then it also follows that both $S_{UA}$ and $S_{UB} >> S_{DB}$. It also follows that:

$$S_{DB} \cong S_{TB} \qquad [48]$$

and in Equations [35]-[37]

$$F_1, F_3 >> F_2 \qquad [49]$$

Using [48] and [49] in Equation [34] results in $$L_{D1} = \left(\frac{R_L S_{TB(L)}}{R_{CS}S_{TB}}\right)^{\frac{1}{(1+K)}} \qquad [50]$$

Applying Equation [28] results in $$L_{U1} = \left(\frac{R_L S_{TB(L)}}{R_{CS}S_{TB}}\right)^{\frac{K}{(1+K)}} \qquad [51]$$

When terms in [51] are measured in dB, the estimated Terminal 1 side uplink fade can then be approximated by the simple expression:

$$L_{U1dB} = \frac{K}{(1+K)}(R_{LdB} + S_{TB(L)dB} - R_{CSdB} - S_{TBdB}) \quad [52]$$

It is important to note that the terms $R_{LdB}$, $S_{TB(L)dB}$, $R_{CSdB}$ and $S_{TBdB}$ in [52] can be directly measured by the modem in Terminal 1 (not based on intermediate component Es/No values as in the optimal algorithm). As noted previously, in Paragraph 0045, the value of K in [52] can be approximated by knowledge of rain model parameters for a given frequency of operation, or alternately can be estimated using measurements made in system operation (example calculations shown in Paragraphs [0074-0077]).

Likewise, the large Q approximation of $L_{U2}$ can be determined by noting that for Q>>0 it follows that:

$$S_{DA} \cong S_{TA} \quad [53]$$

and in Equations [45]-[47]

$$F_1, F_3 >> F_2 \quad [54]$$

Using [53] and [54] in Equation [44] results in $$L_{D2} = \left(\frac{R_{CS}S_{TA(L)}}{R_L S_{TA}}\right)^{\frac{1}{(1+K)}} \quad [55]$$

Applying Equation [43] results in $$L_{U2} = \left(\frac{R_{CS}S_{TA(L)}}{R_L S_{TA}}\right)^{\frac{K}{(1+K)}} \quad [56]$$

When terms in [56] are measured in dB, the estimated Terminal 2 side uplink fade is:

$$L_{U2dB} = \frac{K}{(1+K)}(R_{CSdB} + S_{TA(L)dB} - R_{LdB} - S_{TAdB}) \quad [57]$$

Similar to the result in [52], SNR and CnC ratio parameters in [57] are directly measured by the modem in Terminal 2. The parameter K is approximated knowledge of the rain model and satellite frequency of operation, or estimated during operation (example shown in Paragraphs 0074-0077)

K Estimation: In addition to approximating the value of K using knowledge of rain model and satellite frequency of operation, K can also be estimated using measurements made in system operation. If Q=∞ in the satellite communication model, and if one defines the difference in the Es/No values measured at each terminal (Signal A measured by Terminal 2, Signal B measured by Terminal 1) and the difference in CnC ratio in dB as:

$$\Delta S_{TAdB} = S_{TAdB} - S_{TA(L)dB}$$

$$\Delta S_{TBdB} = S_{TBdB} - S_{TB(L)dB}$$

$$\Delta R_{dB} = R_{CSdB} - R_{LdB} \quad [58]$$

Then with Q=∞, one can show that in terms of rain loss:

$$\Delta S_{TAdB} = L_{U1dB} + L_{D2dB} \quad [59]$$

$$\Delta S_{TBdB} = L_{U2dB} + L_{D1dB} \quad [60]$$

$$\Delta R_{dB} = L_{U1dB} - L_{U2dB} \quad [61]$$

Using the rain model assumption that:

$$\frac{L_{U1dB}}{L_{D1dB}} = \frac{L_{U2dB}}{L_{D2dB}} = K \quad [62]$$

One can solve [59]-[62] to yield:

$$K_{EST} = \frac{\Delta R_{dB}}{\Delta R_{dB} + \Delta S_{TBdB} - \Delta S_{TAdB}} \quad [63]$$

Equation [63] above is 0/0 undefined whenever $\Delta R_{dB}$=0. This situation physically occurs whenever the rain attenuation is the same on both sides of the link. The denominator can also be zero at other times if Q is not equal to ∞ in the actual satellite communications model and rain is occurring on both sides of the link. However, when the denominator of [63] is non-zero (which is the majority of operating conditions when rain loss is occurring on the link) [63] can be used to estimate a value of K.

The CnC power control algorithm uses the baseline optimized link parameters described above together with the above-referenced mechanism to calculate excess link attenuation factors with appropriate estimation averaging to determine if excess uplink and downlink attenuation has been changed by rain or other factors 320. Output measurements of SNRs, Rx Power, Tx Power, and Error Rates may be used to make this determination 370. If values of $L_{U1}$, $L_{U2}$, $L_{D1}$, and $L_{D2}$, are unchanged, no action is taken. In the event that a change is detected, the algorithm branches to attempt compensation 330.

Within the RF power limits of each terminal, excess uplink attenuation $L_{U1}$ and $L_{U2}$, can be compensated by increasing the transmit RF power of the appropriate modem 340. Compensating for the excess uplink attenuation automatically maintains the target PEB at the satellite established in the system line-up conditions.

Depending on the attenuation conditions, once the uplink power has been compensated, the margins on the links may or may not be balanced. Potential imbalance can arise from unequal downlink attenuation $L_{D1}$, and $L_{D2}$. Hence the SNRs at each modem are also continuously monitored. After correcting for uplink attenuation, a determination is made as to whether the link is optimized 350. If the margin imbalance exceeds some threshold, the algorithm returns to the "Optimize Link" stage 310 or else it returns to the "Monitor and Estimate Excess Link Attenuation" stage.

The implementations listed here, and many others, will become readily apparent from this disclosure. From this, those of ordinary skill in the art will readily understand the versatility with which this disclosure may be applied.

The invention claimed is:

1. A method of transmitting telecommunications data comprising:
    modulating a first and a second data signal for transmitting over a telecommunications system using a modulation format;
    selecting transmit powers of a first terminal and a second terminal such that a predetermined power equivalent bandwidth (PEB) is achieved through an un-attenuated telecommunications channel of the telecommunications system;
    transmitting the first and second data signals through the telecommunications channel to a remote receiver, the first data signal being transmitted from the first terminal and the second data signal being transmitted from the second terminal;

transmitting, by the remote receiver, the first data signal to the second terminal and the second data signal to the first terminal;

measuring a total received signal-to-noise ratio of the first data signal received at the second terminal and a total received signal-to-noise ratio of the second data signal received at the first terminal;

measuring a ratio of a signal power density of the first data signal to a signal power density of the second data signal;

determining a ratio of excess uplink loss at the first terminal to excess downlink loss at the first terminal based on one or more rain model parameters and an operating frequency of the remote receiver;

calculating excess uplink and downlink losses relative to uplink and downlink losses of an optimized, un-attenuated telecommunications channel; and changing a transmit power of at least one of the first and second terminals such that the predetermined PEB is maintained for the telecommunications channel when at least one of the first and second data signals experiences attenuation from one or more external environmental factors.

2. The method of claim 1, wherein maintaining the predetermined PEB further comprises optimizing a link margin of the first data signal and a link margin of the second data signal, wherein each link margin is equal to a difference between signal-to-noise ratio of a data signal received at one terminal and a threshold signal-to-noise ratio.

3. The method of claim 1, wherein calculating the uplink and downlink losses for the telecommunications channel further comprises estimating one or more of four component signal-to-noise ratio values in the telecommunications channel.

4. The method of claim 1, wherein calculating the uplink and downlink losses is based on one or more un-attenuated communications parameter assumptions without estimating at least one component signal-to-noise link budget value.

5. The method of claim 3, further comprising conducting a link budget analysis to determine a ratio of uplink to downlink signal-to-noise for at least one of the first and second data signals transmitted over the un-attenuated telecommunications channel.

6. The method of claim 2, further comprising monitoring at least one of the link margins for a loss in performance of a telecommunications link.

7. The method of claim 6, wherein the first and second data signals are optimized when the link margin of the first data signal and the link margin of the second data signal are equal at the first and second terminals.

8. The method of claim 1, further comprising estimating an uplink to downlink excess loss ratio (K) by applying estimation averaging of pre-determined ratios of uplink to downlink attenuation based on one or more rain models for one or more rain attenuation factors at a remote receiver carrier frequency or frequency band.

9. The method of claim 1, further comprising estimating of an uplink to downlink excess loss ratio (K) using one or more values obtained from measurements of a received data signal.

10. The method of claim 6, further comprising adjusting the transmit power of one or more terminals when a change in the uplink to downlink excess loss ratio (K) is detected.

11. The method of claim 10, further comprising iteratively monitoring the link margins and determining whether an imbalance of signal-to-noise ratio exists between two terminals that exceeds a predetermined threshold after an adjustment of the transmit power of one or more terminals has been made in response to detecting attenuation.

12. The method of claim 10, further comprising monitoring a signal-to-noise ratio of a received data signal at two or more receiving terminals.

13. The method of claim 12, further comprising detecting unequal link margins at the two or more terminals.

14. The method of claim 12, further comprising optimizing the first and second data signals if an imbalance of link margins between two terminals is detected that exceeds a predetermined threshold.

15. A system of transmitting telecommunications data comprising:

one or more modulators configured to modulate a first and a second data signal using a modulation format;

one or more transmitters configured to receive the first and second data signals from the one or more modulators and that are configured to transmit the first and second data signals at selected power levels of a first terminal and a second terminal such that a predetermined power equivalent bandwidth (PEB) is achieved through an un-attenuated telecommunications channel;

a remote receiver configured to receive the first data signal transmitted by the first terminal and the second data signal transmitted by the second terminal and transmit the first data signal to the second terminal and the second data signal to the first terminal;

one or more signal processors configured to:

measure a total received signal-to-noise ratio of the first data signal received at the second terminal and a total received signal-to-noise ratio of the second data signal received at the first terminal;

measure a ratio of a signal power density of the first data signal to a signal power density of the second data signal;

determine a ratio of excess uplink loss to excess downlink based on one or more rain model parameters and remote receiver carrier operating frequency;

determine a ratio of excess uplink and downlink losses at the first and second terminals relative to uplink and downlink losses of an un-attenuated telecommunications channel; and one or more power controllers configured to change a transmit power of at least one of the first and second terminals such that the predetermined PEB is maintained for the telecommunications channel when at least one of the first and second data signals experiences attenuation from one or more external environmental factors.

16. The system of claim 15, wherein the one or more power controllers are further configured to maintain the predetermined PEB while optimizing a link margin of the first data signal and a link margin of the second data signal, wherein the link margin is equal to a difference between signal-to-noise ratio of a data signal received at one terminal and a threshold signal-to-noise ratio.

17. The system of claim 15, wherein the one or more processors are further configured to calculate uplink and downlink losses for the telecommunications channel by estimating one or more of four component signal-to-noise ratio values in the un-attenuated telecommunications channel.

18. The system of claim 15, wherein the one or more processors are further configured to calculate uplink and downlink losses using one or more un-attenuated communications parameter assumptions without estimating one or more component signal-to-noise link budget values.

19. The system of claim 17, wherein the one or more processors is further configured to conduct a link budget analysis to determine a ratio of uplink to downlink signal-to-noise for at least one of the first or second data signals transmitted over the un-attenuated telecommunications channel.

20. The system of claim 16, wherein the one or more signal processors are configured to monitor at least one of the margins for a loss in performance of a telecommunications link.

21. The system of claim 20, wherein the first and second data signals are optimized when the margin of the first data signal and the margin of the second data signal are equal at the first and second terminals.

22. The system of claim 15, wherein the one or more signal processors is further configured to estimate an uplink to downlink excess loss ratio (K) by applying estimation averaging of pre-determined ratios of uplink to downlink attenuation based on one or more rain models for one or more rain attenuation factors at a remote receiver carrier frequency or frequency band.

23. The system of claim 15, wherein the one or more signal processors is further configured to estimate an uplink to downlink excess loss ratio (K) using one or more values obtained from measurements of a received data signal.

24. The system of claim 20, wherein the one or more power controllers is further configured to adjust the transmit power of one or more terminals when a change in the excess loss ratio is detected.

25. The system of claim 24, wherein the one or more signal processors is further configured to iteratively monitor the link margins and determine whether an imbalance of signal-to-noise ratio exists between two terminals that exceeds a pre-determined threshold after an adjustment of the transmit power of one or more terminals has been made in response to detecting attenuation.

26. The system of claim 24, wherein the one or more signal processors is further configured to monitor a signal-to-noise ratio of a received data signal at two or more receiving terminals.

27. The system of claim 26, wherein the one or more signal processors is further configured to detect unequal link margins at the two or more terminals.

28. The system of claim 26, wherein the one or more power controllers is further configured to optimize the first and second data signals if an imbalance of link margins between two terminals is detected that exceeds a predetermined threshold.

* * * * *